(12) United States Patent  (10) Patent No.: US 8,761,081 B2
Sengupta et al.  (45) Date of Patent: Jun. 24, 2014

(54) METHOD AND APPARATUS FOR CELL SEARCHING IN ASYNCHRONOUS CDMA SYSTEMS

(75) Inventors: Chaitali Sengupta, Dallas, TX (US); Yuan Kang Lee, San Diego, CA (US)

(73) Assignee: Texas Instuments Incorporated, Dallas, TX (US)

( * ) Notice: Subject to any disclaimer, the term of this patent is extended or adjusted under 35 U.S.C. 154(b) by 1849 days.

(21) Appl. No.: 10/102,503

(22) Filed: Mar. 19, 2002

(65) Prior Publication Data

US 2003/0223384 A1 Dec. 4, 2003

(51) Int. Cl.
*H04B 7/216* (2006.01)

(52) U.S. Cl.
USPC .......................................................... 370/320

(58) Field of Classification Search
None
See application file for complete search history.

(56) References Cited

U.S. PATENT DOCUMENTS

| | | | |
|---|---|---|---|
| 5,910,948 A | | 6/1999 | Shou et al. |
| 5,945,948 A | * | 8/1999 | Buford et al. ................. 342/457 |
| 6,044,104 A | | 3/2000 | Watanabe |
| 6,088,382 A | | 7/2000 | Maru |
| 6,185,244 B1 | | 2/2001 | Nystrom et al. |
| 6,278,703 B1 | | 8/2001 | Neufeld |
| 6,289,007 B1 | | 9/2001 | Kim et al. |
| 6,310,856 B1 | | 10/2001 | Taipale |
| 6,768,768 B2 | * | 7/2004 | Rao et al. ....................... 375/142 |
| 6,894,996 B2 | * | 5/2005 | Lee ................. 370/337 |
| 7,003,015 B2 | * | 2/2006 | Rieken .......................... 375/130 |
| 2003/0133424 A1 | * | 7/2003 | Liang et al. .................... 370/335 |

OTHER PUBLICATIONS

IEEE Transaction on Communications, vol. 38, No. 2, Feb. 1990, A class of Sequential Tests and its Applications by Yu T. Su and Charles L. Weber.*
Hwang, Sangyun, et al., "A Novel Architecture Design for Multicode CDMA Rake Receiver," IEEE Asia-Pacific Conference on ASIC, Seoul, Korea, Aug. 22-25, 1999.
Su, Yu T., et al., "A Class of Sequential Tests and its Applications," IEEE Transactions on Communications, vol. 38, No. 2, Feb. 1990.

* cited by examiner

*Primary Examiner* — Raj Jain
(74) *Attorney, Agent, or Firm* — Ronald O. Neerings; Wade James Brady; Frederick J. Telecky, Jr.

(57) ABSTRACT

A method for performing a cell search routine commences by using the Synchronization Channel's (SCH) Primary Synchronization Code (PSC) to acquire slot synchronization to a cell (402). This step will collect a number of hypotheses for frame timing. The method then uses a searcher algorithm such as a sequential dwell searcher that can quickly reject all of the wrong hypotheses gathered in the slot synchronization step, and determine the best hypotheses (404). This cell search routine leads to faster cell acquisition times as compared to some prior art techniques. A receiver (502) that includes a cell searcher (504) that performs the method mentioned above is also described.

10 Claims, 3 Drawing Sheets

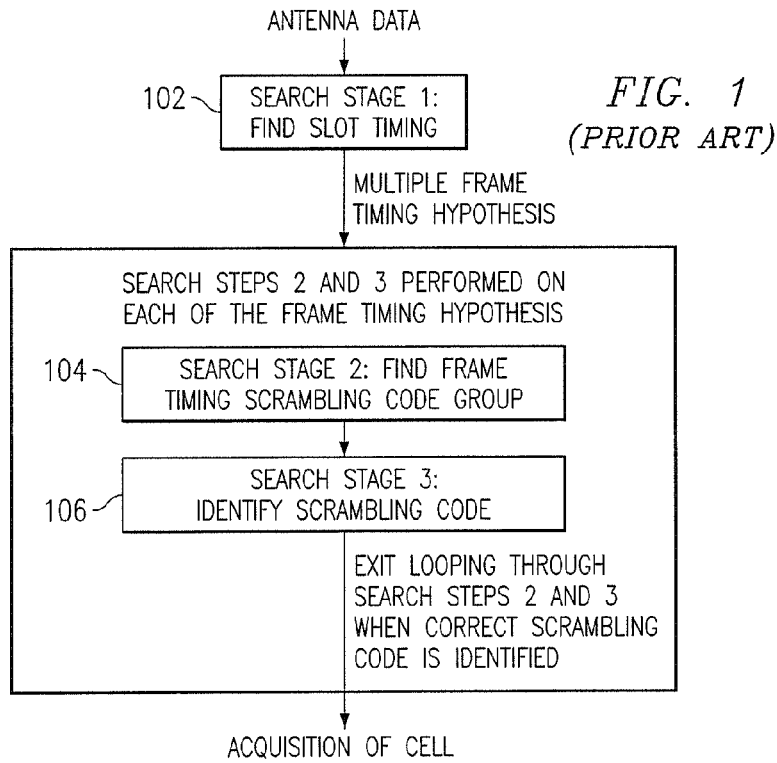
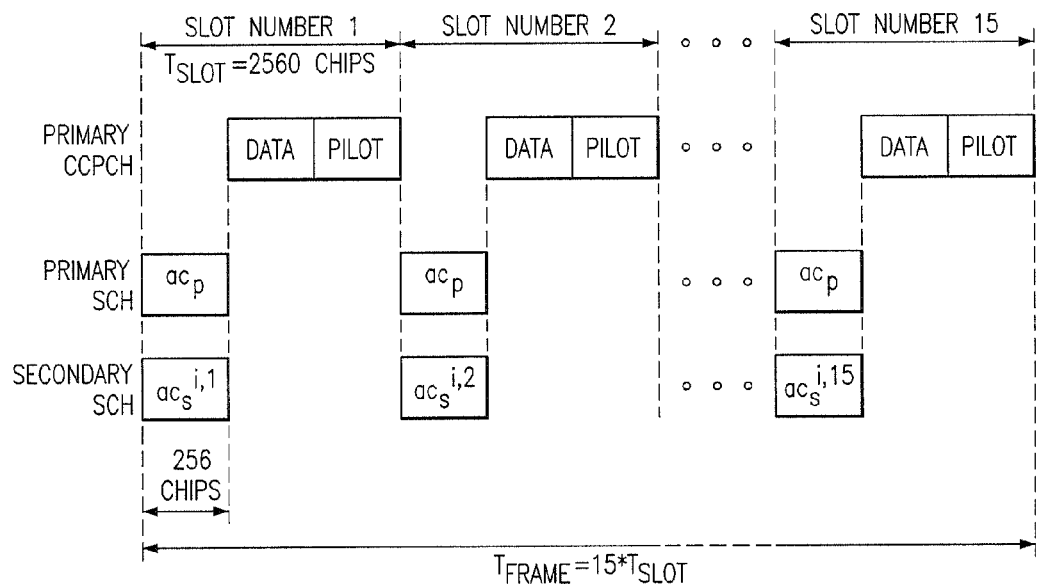

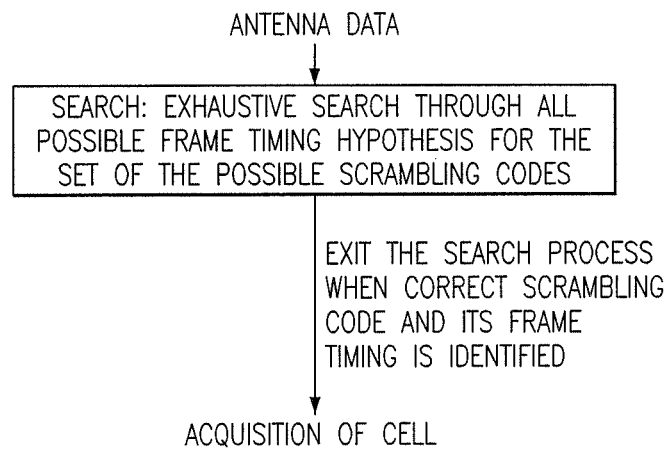
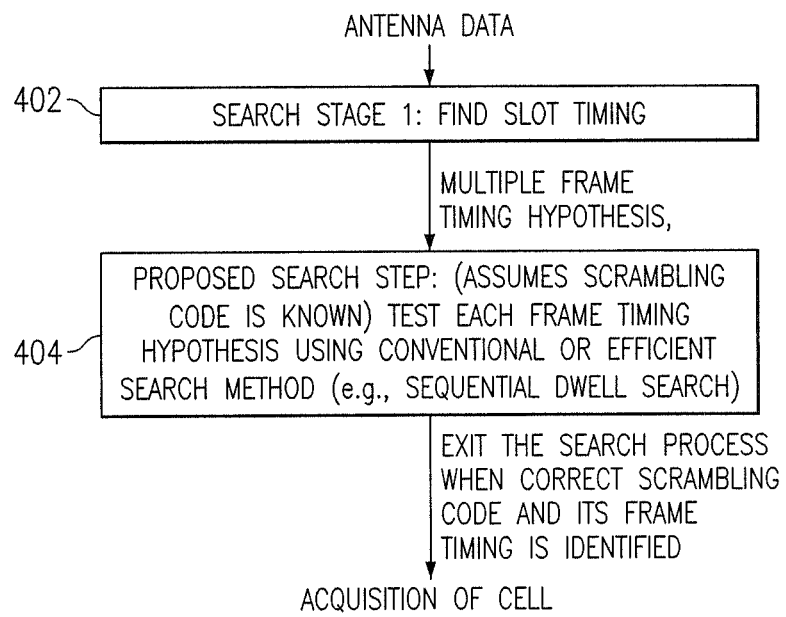

METHOD AND APPARATUS FOR CELL SEARCHING IN ASYNCHRONOUS CDMA SYSTEMS

TECHNICAL FIELD

This invention relates in general to the field of radio communications, and more specifically to a cell searcher for asynchronous CDMA systems.

BACKGROUND

The first step taken by a radio communication device such as a mobile radio unit when commencing communications in a Code Division Multiple Access (CDMA) system is to identify the transmitting base stations or cells in terms of their primary scrambling code and the corresponding frame timing. Prior to commencing communications with a base station, the mobile unit has to synchronize itself with the timing reference of a base station. This process is commonly referred to as cell search. Once the primary scrambling code and frame timing of the target cell has been identified, the mobile unit sets up signaling and user (voice or data) channels to communicate with the base station. In third Generation Partnership Project Frequency Division Duplex (3GPP FDD) Direct Sequence (DS) systems, often referred to as Wideband Code Division Multiple Access (W-CDMA), the cell search is typically carried out in three main stages as follows:

Stage 1). Slot synchronization: During this first stage of the cell search procedure, the mobile unit uses the Synchronization Channel's (SCH) Primary Synchronization Code (PSC) to acquire slot (e.g., slots occur in 666 μs time intervals) synchronization to a cell as shown in step 102 of FIG. 1. The PSC is a 256-chip length synchronization to a cell as shown in step 102 of FIG. 1. The PSC is a 256-chip length code transmitted every slot and all cells transmit the same PSC. This process involves matched filtering with the PSC. The slot timing of the cell can be obtained by detecting peaks in the matched filter output, relative to the receiver time reference. A diagram highlighting the structure of the SCH channel is shown in FIG. 2, where: $c_p$ is the Primary Synchronization Code, $C_s^{i,k}$ is one of 16 possible Secondary Synchronization Codes ($C_s^{i,1}$, $C_s^{i,2}$, . . . , $C_s^{i,15}$) encode cell specific long scrambling code group "i", and "a" is the modulation on the primary and secondary synchronization codes used to indicate STTD encoding on the PCCPCH.

Stage 2). Frame synchronization and code-group identification: During the second step of the cell search procedure as shown in step 104 of FIG. 1, the mobile unit uses the SCH's secondary code (SSC) to find frame synchronization and identify the code group of the cell found in the first step. All scrambling codes used in 3GPP systems are divided into groups of eight, and the code group is encoded into a sequence of SSCs. Correlating the received signal with all possible SSC sequences, and identifying the maximum correlation value accomplishes this. Since the cyclic shifts of the sequences are unique, the code group as well as the frame synchronization is determined.

Stage 3). Scrambling code identification: During the third and final step of the cell search procedure as shown in step 106 of FIG. 1, the mobile unit determines the exact primary scrambling code used by the cell it has found. The primary scrambling code is typically identified through symbol-by-symbol correlation over the common pilot channel (CpiCH) with all eight codes within the code group identified in the second step.

If the mobile unit has received a priority list with information about the set of scrambling codes to search for, steps 104 and 106 above can be simplified. This particular situation can arise in most cases other than when the unit is performing the first "power-on" acquisition sequence. However, if the scrambling code is known, but the cell using that code is not the strongest cell, it may take several iterations of steps 104 and 106 on a number of peaks identified in step 102, to find the target cell. This is because, after step 102, there is no way of distinguishing between peaks due to multi-paths from an already identified cell and paths from the new target cell. So, after step 102, there may be in the order of 100 or more hypotheses to search through using steps 104 and 106, assuming a UE can, in the worst case, receive paths from up to twenty base stations, and an average of five paths from each.

A totally different approach that does not use steps above can be taken to establish frame timing, in the scenario where the scrambling code is known. If the scrambling code or a set of possible scrambling codes is known, it is possible to search through the whole uncertainty window with the known scrambling code(s) and identify the correct scrambling code and the corresponding frame timing as shown in FIG. 3. This is similar to the initial acquisition step in an IS-95 system, and requires searching through 38,400 (i.e., number of chips in a frame) chip offsets in order to locate the frame timing.

Both of the above approaches, will result in cell acquisition times of several 100 milliseconds, as well as require a large amount of processing resources, in spite of the fact that the set of possible scrambling codes are known. A need thus exist in the art for a cell search scheme that can help reduce the time and computational resources required to execute a cell search routine.

BRIEF DESCRIPTION OF THE DRAWINGS

The features of the present invention, which are believed to be novel, are set forth with particularity in the appended claims. The invention, may best be understood by reference to the following description, taken in conjunction with the accompanying drawings, in the several figures of which like reference numerals identify like elements, and in which:

FIG. 1 shows a flow chart highlighting the steps taken in a first prior art cell search routine.

FIG. 2 shows a diagram showing the structure of a SCH channel.

FIG. 3 shows a flow chart highlighting the steps taken in a second prior art cell search routine.

FIG. 4 shows a flow chart highlighting the steps taken in accordance with the cell search routine of the preferred embodiment.

DETAILED DESCRIPTION OF THE PREFERRED EMBODIMENT

Figure 5:
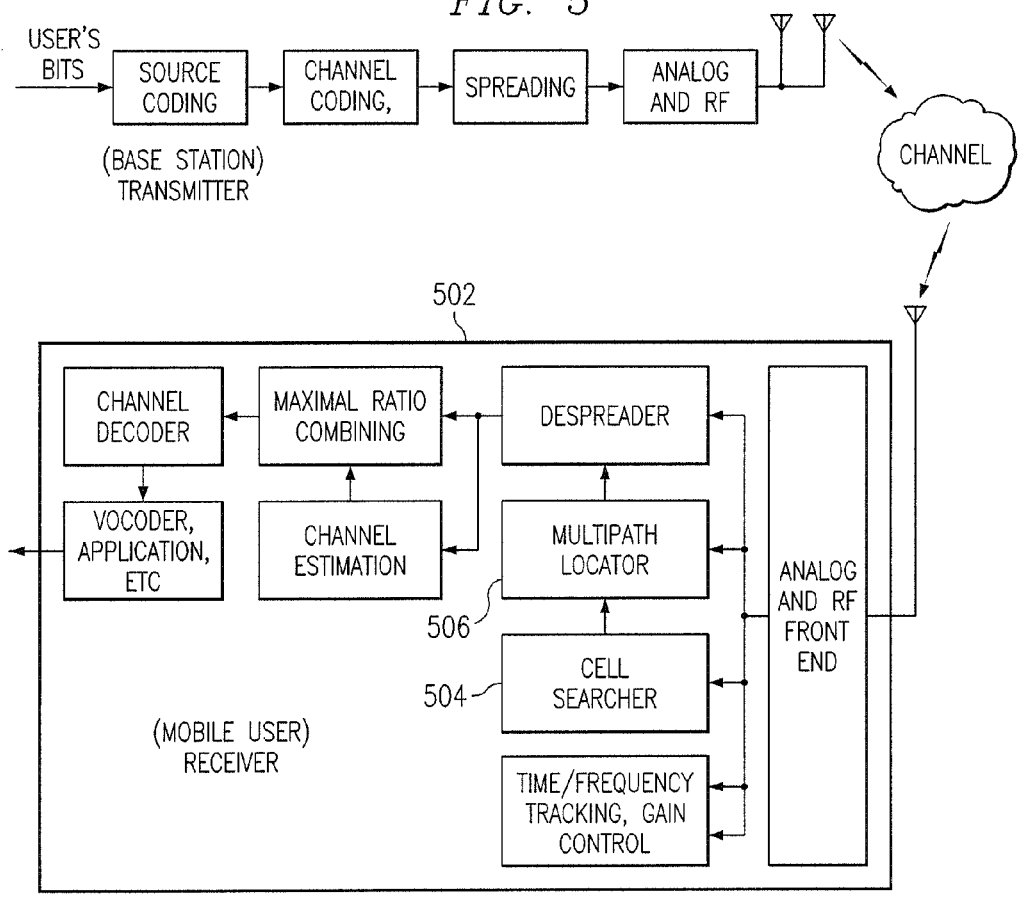
FIG. 5 shows a block diagram of a communication system including a receiver in accordance with the present invention.

While the specification concludes with claims defining the features of the invention that are regarded as novel, it is believed that the invention will be better understood from a consideration of the following description in conjunction with the drawing figures, in which like reference numerals are carried forward.

The present invention reduces the time required to find the timing of a new cell whose primary scrambling code is provided to the user equipment (UE) (e.g., mobile telephone (handset), etc.) by a base station. It starts the process by performing the known slot synchronization step discussed above and as shown in step 402 of FIG. 4. Performing the slot synchronization step reduces the uncertainty window by a factor of approximately twenty.

After Step 402 is performed, if for example, there are 100 hypotheses on slot timing, there are then 100*15=1500 hypotheses for frame timing, assuming a frame is composed of 15 consecutive slots. After step 402 has been completed, the task is to establish frame timing, based on the 1,500 hypotheses. Note that instead of the 38,400 hypotheses needed in the second prior art approach mentioned above, there are only 1,500 hypotheses.

According to the invention, a searcher algorithm is used that can efficiently and quickly reject wrong hypotheses in step 404. One searcher algorithm that can be used for the present invention is a sequential dwell searcher described in an article found in IEEE Transaction on Communications, Vol. 38, No. 2, February 1990, entitled "A class of Sequential Tests and its Applications" by Yu T. Su and Charles L. Weber, which is hereby incorporated by reference as if fully set forth herein. The use of a sequential dwell searcher in this stage, that quickly rejects the wrong hypotheses, allows the entire search through the 1,500 hypotheses to complete in tens of milliseconds. Other searcher algorithms that can search through slot-periodic uncertainties and that are well known to those of ordinary skill in the art can also be used to perform step 404.

The searcher algorithm will efficiently and quickly reject wrong hypotheses and switch between hypotheses until all of the 1,500 hypotheses are analyzed. Step 404 is performed instead of steps 104 and 106 mentioned in the background section for the first prior art approach discussed, which would perform steps 104 and 106 on each of the 100 peaks found in step 102.

One benefit of the above approach is improved performance of WCDMA systems to quickly acquire a new cell in steady state when the scrambling code is known. It drastically reduces the cell acquisition time from several hundred milliseconds as required by the prior art approaches mentioned, to approximately tens of milliseconds using the present invention. The reduced cell acquisition time arises from three main sources. First, the use of the search step 402 to establish slot synchronization cuts down the number of frame timing hypotheses from 38,400 to 1500. Second, the use of a searcher such as the sequential dwell searcher efficiently searches through the remaining frame timing hypotheses in step 404. Third, the CpiCH channel has much higher average energy than the SSC code of the SCH (typically, more than 20 times greater (13 dB)). The more energy-received means less time is required for cell acquisition.

The method of the present invention leads to faster cell acquisition times using less hardware, than that would be needed to repeatedly perform the frame synchronization and code-group identification of step 104 and the scrambling code identification step 106 on all the peaks obtained from the slot synchronization of step 102. Moreover, the search through the frame-timing hypothesis can be done by the same hardware as that used for the multipath locator, thus requiring no extra hardware at all.

A block diagram of a communication system including a receiver 502 that has a cell searcher 504 in accordance with the invention is shown in FIG. 5. In one embodiment of the invention, a multipath locator 506 that is typically used to locate multipaths for the receiver is also used to perform step 404, thereby further reducing the hardware necessary to perform the present invention.

The cell searcher of the present invention addresses a need in an asynchronous CDMA system such as 3GPP-FDD to tailor a cell search scheme to the most commonly occurring case when the priority list of scrambling codes are known, as any such scheme is missing in the 3GPP recommended procedures. The searcher fulfills this need in the art by recognizing the short comings of the 3GPP Stages 1-3 and the conventional exhaustive searcher when applied to this specific but commonly occurring case. The cell searcher of the present invention uses a novel two-step approach to get better performance at lower cost. It exploits the slot timing acquisition scheme in 3GPP to reduce the number of frame timing hypotheses and then performs frame timing search directly on the CPICH channel (which has higher power) to complete the cell search process.

It must be noted that cell search is widely recognized as one of the most challenging aspects of a mobile unit receiver design as its performance is directly related to stand-by and talk times, as well as to call-drop rates specifications for mobile units. An efficient and low-cost cell search scheme as disclosed can make a big difference in the competitive wireless marketplace.

While the preferred embodiments of the invention have been illustrated and described, it will be clear that the invention is not limited to the preferred embodiments. Numerous modifications, changes, variations, substitutions and equivalents will occur to those skilled in the art without departing from the spirit and scope of the present invention as defined by the appended claims. The present invention provides for a time-efficient and cost effective way of acquiring cell timing in a handset in an asynchronous CDMA system, when a list of possible scrambling codes are known to the user equipment.

The invention claimed is:

1. A method for cell searching in a wireless receiver when a scrambling code is known by the wireless receiver and a base station broadcasts a common pilot channel (CPTCH), comprising the steps of:
   (a) performing slot synchronization for cell searching in order to determine a group of hypotheses for frame timing; and
   (b) performing a frame timing search on of the CPICH using the group of hypotheses.

2. A method as defined in claim 1, wherein step (b) is performed by a sequential dwell searcher.

3. A method as defined in claim. 1, wherein steps (a) through (b) are performed by a handset attempting to establish communication with one of a number of base stations in an asynchronous CDMA system when a set of possible scrambling codes is known.

4. A method as defined in claim 1, wherein step (b) is performed by a multipath locator.

5. A method as defined in claim 1, wherein the cell searching is an asynchronous code division multiple access (CDMA) cell search.

6. A wireless communication receiver having a known scrambling code, comprising:
   an antenna; and
   a cell searcher coupled to the antenna, the cell searcher performing slot synchronization in order to determine a group of hypotheses for frame timing and performing a frame timing search on a common pilot channel (CPICH) using the group of hypotheses.

7. A wireless communication receiver as defined in claim 6, wherein the group of hypotheses is processed by the cell searcher using a sequential dwell searcher.

8. A wireless communication receiver as defined in claim 6, wherein the cell searcher attempts to establish communication with one of a number of base stations in an asynchronous CDMA system when a set of possible scrambling codes is known.

9. A wireless communication receiver as defined in claim 6, wherein the group of hypotheses is processed by the cell searcher using a multipath locator.

10. A wireless communicator as defined in claim 6, wherein the cell searcher performs an asynchronous code division multiple access (CDMA) cell search.

* * * * *